United States Patent [19]

Speer et al.

[11] Patent Number: 5,021,092
[45] Date of Patent: Jun. 4, 1991

[54] METHOD FOR THE PREPARATION OF GRAY-GREEN PIGMENTS BASED ON ZIRCONIUM SILICATE/VANADIUM COMPOUNDS AND SODIUM COMPOUND

[75] Inventors: Dietrich Speer, Hanau; Akos Kiss, Wasserlos; Peter Kleinschmit, Hanau, all of Fed. Rep. of Germany

[73] Assignee: Degussa Aktiengesellschaft, Frankfurt am Main, Fed. Rep. of Germany

[21] Appl. No.: 389,761

[22] Filed: Aug. 4, 1989

[30] Foreign Application Priority Data

Aug. 10, 1988 [DE] Fed. Rep. of Germany ....... 3827068

[51] Int. Cl.$^5$ ................................................ C08K 3/22
[52] U.S. Cl. .................................... 106/451; 106/400; 106/401; 106/461; 106/479; 106/481
[58] Field of Search .......................................... 106/451

[56] References Cited

U.S. PATENT DOCUMENTS 2,441,447 6/1947 Seabright ............................ 106/299

Primary Examiner—William R. Dixon, Jr.
Assistant Examiner—Scott L. Hertzog
Attorney, Agent, or Firm—Beveridge, DeGrandi & Weilacher

[57] ABSTRACT

The preparation of gray-green unitary pigment bodies based on zirconium silicate-vanadium oxide wherein a mixture of zirconium oxide and silicon oxide in the presence of a vanadium and lithium compound is calcined above 600° C. and wherein the amount of $V_2O_5$ is more than 17 percent by weight and the amount of lithium compound added is such that the atom ratio Li/Li+V is from 0.1 to 0.5.

11 Claims, No Drawings

METHOD FOR THE PREPARATION OF GRAY-GREEN PIGMENTS BASED ON ZIRCONIUM SILICATE/VANADIUM COMPOUNDS AND SODIUM COMPOUND

The present invention relates to a method for the preparation of gray-green unitary pigments based on zirconium silicate-vanadium oxide through calcination of a mixture formed of zirconium oxide, silicon oxide, vanadium oxide and lithium compounds at temperatures above 600° C.

INTRODUCTION AND BACKGROUND

A whole series of pigments are known based on zirconium silicates in which the lattice configuration of the zirconium silicate has built into it color forming metal ions; such as for example, zirconium praseodymium yellow or zircon vanadium blue.

In U.S. Pat. No. 2,441,447, there is described blue and green pigments based on zirconium silicate-vanadium oxide which are produced through calcination of zirconium-, silicon- and vanadium compounds at temperatures above 550° C. In the case of the blue pigments, the yield contains in addition to up to 17% by weight vanadium oxide additionally up to 5 weight percent of alkali halogenides. Green pigments result only in the absence of alkali halogenides and arise from a mix of vanadium doped yellow zirconium oxides, vanadium doped blue zirconium silicate and silicon oxide. The prior art deals therefore with a mixed pigment and not with a unitary pigment type as would be desired because of industrial application purposes.

In the publications of Th. Goldschmidt, 2/83, No. 59, there is described on page 13 a zircon-vanadium blue pigment. Herewith are used a variety of sodium salts such as sodium fluoride, sodium chloride, $Na_2CO_3$, $Na_2SO_4$ and $NaNO_3$ as flux material for the preparation of the known zirconium-vanadium blues. As contrasted therewith, the corresponding lithium and potassium salt lead mostly to a greenish-blue colored pigment. This document provides no information for the preparation of a gray-green zirconium-vanadium pigment body.

SUMMARY OF THE INVENTION

It is an object of the invention therefore is to provide a method for the preparation of gray-green pigment bodies based on zirconium silicate-vanadium oxide through calcination of a mix of zirconium-silicon-vanadium and lithium compounds at temperatures above 600° C. A further object of the invention is to provide a unitary gray-green pigment body type that has a zirconium silicate lattice structure.

A feature of the present invention resides in a method for the preparation of gray-green pigment bodies based on zirconium silicate-vanadium oxide through calcination of a mixture of zirconium oxide and silicon oxide in a mole relationship of about 1:1 under the addition of vanadium oxide, in particular, in the form of ammonium vanadate, together with lithium compounds at a temperature above 600° C.

It is a further feature of the invention that the charged amount of vanadium oxide calculated as $V_2O_5$ is more than 17 weight percent and the amount of lithium compounds added to the mixture is such that the atom ratio Li/Li+V, calculated as metal is between from 0.1 and up to 0.5. Advantageously, the atom ratio Li/Li+V should be between from 0.2 to 0.4.

With calcination that takes place over several hours of the compositional mixtures according to the invention, one obtains a gray-green pigment body which consists exclusively of zirconium silicate. Optionally, one can also add a sodium salt as a mineralizer.

DETAILED EMBODIMENTS OF THE INVENTION

The following examples serve to illustrate the invention:

1. 59.6 g zirconium oxide ($ZrO_2$), 29.85 g silicon oxide ($SiO_2$), 20.53 g vanadium oxide ($V_2O_5$), 2.32 g sodium chloride and 2.92 g sodium fluoride as mineralizers were mixed together with 3.3 g lithium carbonate and the mixture was calcined for 1 hour at 800° C. One obtains a gray-green pigment which consists of zirconium silicate as established by x-ray diffraction measurements.

2. To a mixture of 59.6 zirconium oxide and 29.85 g silicon oxide, there was added 28.31 g ammonium vanadate ($NH_4VO_3$) and 3.3 g lithium carbonate. After a 1 hour calcination of 800° C., one obtains thereby a gray-green pigment product.

The pigment products that are obtained in accordance with the present invention exhibit a particular facility for the coloration of glazes. The atomic ratio Li/Li+V of the calcined mass in Example 1 is 0.2835 and in Example 2 is 0.2695.

Further modifications and variations of the present invention will be apparent to those skilled in the art from the foregoing and are intended to be encompassed by the claims appended hereto.

We claim:

1. A method for the preparation of a gray-green pigment body based on zirconium silicate and vanadium oxide comprising forming a mixture of zirconium oxide and silicon oxide in a mole ratio of about 1:1 and in a sufficient amount of each to be capable of forming the desired gray-green pigment body and adding thereto (a) vanadium oxide or ammonium vanadate and (b) lithium compounds and at least one sodium compound as mineralizers and heating at a temperature over 600° C. to achieve the pigment formation, wherein said vanadium compound, calculated as $V_2O_5$, is present in a quantity of over 17 weight percent of the mixture, and the amount of said lithium compound used is such that the atom ratio Li/Li+V, calculated as metal, ranges from 0.1 to 0.5 and said sodium compound is present in an amount effective to support the mineralizing action of said lithium compound.

2. The method in accordance with claim 1, wherein the vanadium compound is added as ammonium vanadate.

3. The method in accordance with claim 1, wherein the atom ratio Li/Li+V is from 0.2 to 0.4.

4. The method in accordance with claim 1, wherein the lithium compound is lithium carbonate.

5. A gray-green unitary pigment product formed by the method in accordance with claim 1.

6. A gray-green zirconium silicate pigment made by the method of claim 1 containing lithium and vanadate metal ions in an atom ratio Li/Li+V of 0.1 to 0.5.

7. The gray-green zirconium silicate pigment in accordance with claim 6, wherein said atom ratio Li/Li+V is 0.2835.

8. The gray-green zirconium silicate pigment in accordance with claim 6, wherein the atom ratio Li/Li+V is 0.2695.

9. The method in accordance with claim 1, wherein said sodium compounds are approximately 4 weight percent of the mixture.

10. The method in accordance with claim 1, wherein said zirconium oxide is approximately 50 weight percent of the mixture and said silicon oxide is approximately 25 weight percent of the mixture.

11. The method in accordance with claim 1, wherein said components are present in approximately the following weight percent: zirconium oxide 50.3%, silicon oxide 25.2%, vanadium oxide 17.3%, lithium carbonate 2.8%, sodium chloride 1.9%, and sodium fluoride 2.5%.

* * * * *